June 16, 1942.     J. W. DAWSON ET AL     2,286,211
ARC WELDING SYSTEM AND METHOD
Filed Oct. 11, 1940
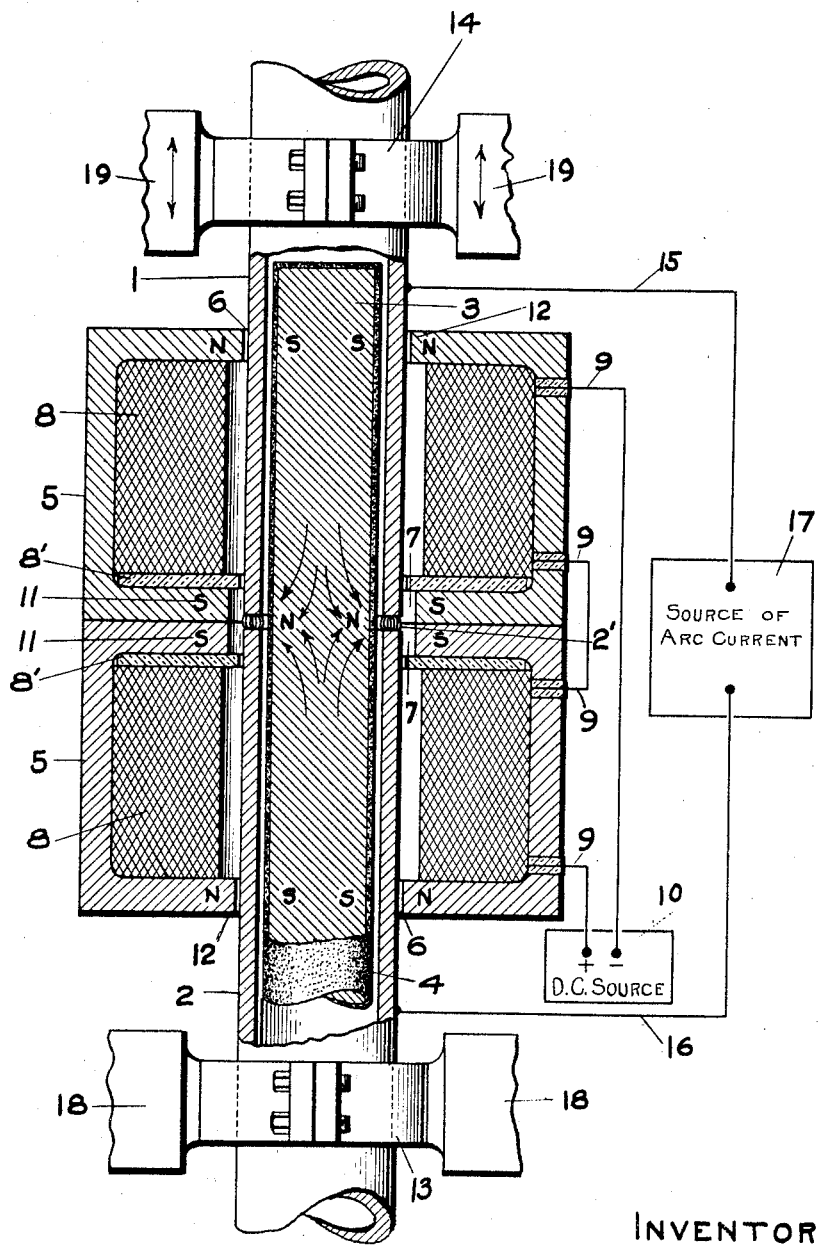
INVENTORS.
JOHN W. DAWSON,
LAURENCE K. MARSHALL,
BY Elmer J. Gorn
ATTY.

Patented June 16, 1942

2,286,211

UNITED STATES PATENT OFFICE 2,286,211

ARC WELDING SYSTEM AND METHOD

John W. Dawson, Auburndale, and Laurence K. Marshall, Cambridge, Mass., assignors to Raytheon Manufacturing Company, Newton, Mass., a corporation of Delaware Application October 11, 1940, Serial No. 360,796

4 Claims. (Cl. 219—4)

This invention relates to a system and a method for producing welding by means of an electric arc. Heretofore such arcs have been of the type which operate at a localized spot and produce localized heating of the bodies to be welded.

An object of this invention is to devise a system and a method in which an electric arc is dispersed or moved over a relatively extended surface to produce substantially uniform heating of said extended surface, whereby a good weld may be produced throughout said surface at one time.

Another object is to distribute the heat of an arc over an extended surface by moving said arc rapidly over said surface, whereby said heat is caused to penetrate into the work without excessive surface heating.

Another object is to produce such motion or dispersion by subjecting the arc to a transverse magnetic field.

A still further object is to produce such a system and method which is simple and reliable.

The foregoing and other objects of this invention will be best understood from the following description of an exemplification thereof, reference being had to the accompanying drawing wherein the figure is a cross-sectional view of an apparatus for carrying out the invention, together with a diagrammatic circuit of the system.

In the drawing, two metal bodies 1 and 2 which are shown in the form of tubes or pipes are to be welded to each other along their adjacent edges so as to form a continuous tube or pipe. The pipes 1 and 2 are held spaced apart so as to provide an annular gap 2', in which an arc is to be established. A rod 3 of magnetic material is inserted inside the pipes 1 and 2 so as to extend past the gap 2' to a point substantially above said gap. The rod 3 is preferably coated with a refractory insulating material 4 which prevents the arc current from flowing through the rod 3 and also provides a refractory surface for withstanding the heat of the arc. Surrounding the pipes 1 and 2 respectively is a pair of magnetic shells 5—5. Each of these shells is provided with aligned openings 6 and 7 through which the pipes 1 and 2 may be inserted. In the outer annular space provided in each of the shells 5, an annular coil 8 is placed for the purpose of setting up a magnetic flux in each of the shells 5. If desired a refractory washer 8' may be placed at one end of each coil 8 so as to shield and protect said coil against the heat generated by the arc in the gap 2'. The terminals of each coil 8 are provided with leads 9 passing through insulating bushings to the exterior of the shells 5. The leads 9 are arranged to connect the coils 8 in series with each other and with a source of magnetizing current, such as a direct current source 10.

The edges of the openings 7 in the shells 5 provide adjacent annular pole pieces 11—11. If desired the faces of the pole pieces 11 may likewise be protected from the heat of the arc by coating said faces with refractory material. The coils 8 are selected of such polarity as to make the adjacent pole pieces 11—11 of the same polarity. For example, the adjacent poles 11—11 may be made south poles. The edges of the openings 6 provide the opposite poles 12 which, in the example given above, will be north poles. Upon energizing the coils 8 as described, the rod 3 will have a localized south pole produced adjacent each of the annular poles 12, and a localized central north pole adjacent the annular pole pieces 11. Under these conditions a substantial amount of magnetic flux will pass radially throughout substantially the entire gap 2'.

In order to hold the pipes 1 and 2 in the position as described, the lower pipe 2 may be securely held in a clamp 13 which is rigidly held in place by stationary base members 18—18. The upper pipe 1 may be held in a clamping member 14 supported by movable members 19—19. The movable members 19 are adapted to hold the pipes 1 and 2 separated by a predetermined amount, and to move the lower end of the pipe 1 into intimate engagement with the upper end of the pipe 2. If desired the shells 5 may be moved apart a slight distance in order that the action of the arc may be observed.

The pipes 1 and 2 have electrically connected thereto conductors 15 and 16 which are connected respectively to the two terminals of a suitable source of arc current 17. The source 17 may supply current of any suitable nature, which may be in the form of direct current or alternating current, or any specialized current form particularly adapted for the purpose for which it is to be used.

When the sources 10 and 17 are energized, an arc is struck in the gap 2' in any suitable manner. For example, the arc may be struck by the members 19 moving the pipe 1 into engagement with the pipe 2, and then separating the edges of said pipes in order to strike the arc. An "arc" in the sense as used in the specification and claims is an electrical space discharge which occurs between two separated surfaces of sufficient intensity to produce substantial heating of the surfaces between which the discharge passes. The current of the arc flows longitudinally through the gap 2' while the magnetic field described passes radially through said gap. The reaction between this current and flux produces a force at right angles to the current and flux around the annular gap 2'. This reaction, therefore, produces a dispersion of the arc throughout the gap 2'. In an actual embodiment of this invention, when the system was set in operation as described, the entire gap was filled with an intense continuous white arc which emitted an audible note of approximately 5000 to 10,000 cycles per second. It is believed that the magnetic field moves the arc at high speed around the gap so that the entire surface is uniformly heated to welding temperatures. In absence of the magnetic field, the arc would tend to localize, and thus heat only localized adjacent spots on the two pipes 1 and 2. Due to the fact that the arc is dispersed throughout the gap 2', said gap is substantially filled with metallic and other vapors which substantially prevent any injurious amount of air from coming into contact with the heated metal surfaces. Thus relatively extended surfaces can be heated simultaneously to welding temperatures without the danger of having said surfaces being oxidized by contact with the air. When the proper temperatures are reached, the members 19 are moved with sufficient speed and energy to force the adjacent ends of the pipes 1 and 2 into welding engagement with each other.

This invention lends itself to very accurate control of the conditions and factors at the welding surfaces. In order for a stable arc to be passed between the surfaces, a certain amount of current and therefore a certain rate of energy dissipation must be produced in said arc. In accordance with the present invention, this amount of energy which might produce excessive fusing of the metal surfaces is distributed over a sufficiently large surface area to fix the rate at which energy is supplied at any desired value. By selecting the proper area to which the arc is subjected or by increasing the amount of current beyond the minimum value necessary to maintain the arc, or both, the degree of fusing of the surface and the depth of penetration of the heating can be accurately controlled. The magnetic field, in addition to dispersion or moving the arc as described above, also tends to increase the voltage drop through the arc, thus increasing the amount of energy which can be liberated with a given amount of arc current. This is desirable since the size of equipment for supplying arc current is controlled largely by the amount of current which it is called upon to deliver. Thus the present invention not only increases the amount of energy available in the arc but also creates conditions under which such increased energy can be successfully utilized. It is believed that at any predetermined spot on the surface thus heated an arc spot is established which periodically is removed and returned to said surface. The rate of heating of said localized spot depends on the amount of energy in the arc and the rate at which an arc returns to said spot. Other variations in the conditions at the welding surfaces might be produced. For example, instead of operating the arc in air, gap 2' could be immersed in any other suitable gaseous atmosphere, or might even be evacuated. As already indicated, the source 17 might supply current of any desirable nature. It is to be understood that the source 10, instead of being a direct current source, could likewise supply currents of other types so as to produce any desired variation in the magnetic field which passes through the gap 2'.

Of course it is to be understood that this invention is not limited to the particular details as described above as many variations and equivalents will suggest themselves to those skilled in the art. For example, certain aspects of this invention might be utilized whenever it is desired to heat relatively extended surfaces for any desired purpose. Instead of applying the invention to the welding of pipes, other objects having varying shapes can be welded by utilizing the principles of this invention. In many instances it is not necessary that the arc be moved through circular or closed paths. It is accordingly desired that the appended claims be given a broad interpretation commensurate with the scope of this invention within the art.

What is claimed is:

1. A system for heat-processing a member along and throughout a predetermined extended length of a wall thereof the entire predetermined extended length of which is to be heat-processed, the system having, in combination, means for holding the member, means for holding a second member with a wall thereof disposed adjacent to the first-named wall but separated at all points from the first-named wall by a gap of substantial length, means for striking an arc in the gap while the walls are held separated from each other, and means operable while the walls are held separated from each other for establishing in the gap a magnetic field substantially stationary with respect to the gap and having a substantial component at right angles to the length dimension of the gap to cause the arc to travel in the gap rapidly along and throughout the predetermined extended length to heat the wall of the first-named member rapidly along and throughout the predetermined extended length.

2. A method of welding a member along an extended wall thereof that comprises positioning a similarly extended wall adjacent to the wall of the member but separated at all points therefrom by a gap of substantial length, striking an arc in the gap while the walls are held separated from each other, establishing in the gap a magnetic field substantially stationary with respect to the gap and having a substantial component at right angles to the length dimension of the gap while the walls are held separated from each other to cause the arc to travel in the gap rapidly along and between the extended walls with the terminals of the arc always engaging the respective walls to heat the member rapidly along and throughout the extent of its extended wall, and welding the member along its heated extended wall.

3. A machine for welding together two members each provided with a wall having, in combination, means for holding the members so that the walls shall be disposed adjacent to each other throughout a predetermined extended length but with the walls separated from each other at all points of the predetermined extended length by a gap, means for impressing opposite potentials upon the members to produce an arc in the gap while the walls are held separated from each other, means operable while the walls are held separated from each other for establishing in the gap a magnetic field substantially stationary with respect to said gap and having a substantial component at right angles to the length dimension of the gap to cause the arc to travel in the gap along and throughout the predetermined extended length with sufficient rapidity and a sufficient number of times to heat the walls substantially uniformly throughout the predetermined extended length, and means for pressing the members relatively toward each other to close the gap and bring the heated walls into tight engagement, thereby to cause the members to become welded to each other.

4. A method of heat-processing two annular members that comprises positioning the members so that their end walls are adjacently disposed but not in contact, striking an arc between the adjacently disposed non-contacting end walls, and establishing a magnetic field substantially stationary with respect to the annular members and having a substantial component radially of the annular members to cause the arc to travel rapidly along and throughout the peripheral extent of the end walls.

JOHN W. DAWSON.
LAURENCE K. MARSHALL.